United States Patent [19]

Watari

[11] Patent Number: 5,058,316

[45] Date of Patent: Oct. 22, 1991

[54] METHOD AND APPARATUS FOR CULTIVATING MUSHROOMS

[76] Inventor: Shigenobu Watari, 868-77, Imasato, Kawanakajima-machi, Nagano-shi, Japan

[21] Appl. No.: 397,500

[22] PCT Filed: Feb. 15, 1988

[86] PCT No.: PCT/JP88/00148

§ 371 Date: Aug. 15, 1989

§ 102(e) Date: Aug. 15, 1989

[87] PCT Pub. No.: WO89/07390

PCT Pub. Date: Aug. 24, 1989

[51] Int. Cl.⁵ ............................................. A01G 1/04
[52] U.S. Cl. ................................. 47/1.1; 47/DIG. 6
[58] Field of Search ............... 47/1.1, 1.4, 58, DIG. 6

[56] References Cited

U.S. PATENT DOCUMENTS

| | | | |
|---|---|---|---|
| 4,626,065 | 12/1986 | Mori | 47/1.4 |
| 4,653,472 | 3/1987 | Mori | 47/DIG. 6 |
| 4,969,288 | 11/1990 | Mori | 47/1.1 X |

FOREIGN PATENT DOCUMENTS

| | | |
|---|---|---|
| 53-127145 | 11/1978 | Japan . |
| 58-056617 | 4/1983 | Japan . |
| 60-012913 | 1/1985 | Japan . |
| 61-242524 | 10/1986 | Japan . |
| 8300035 | 8/1984 | Netherlands ............... 47/DIG. 6 |
| 8800483 | 9/1989 | Netherlands ............... 47/DIG. 6 |
| 1018592 | 5/1983 | U.S.S.R. ..................... 47/DIG. 6 |
| 2181122 | 4/1987 | United Kingdom ............ 47/1.1 |

Primary Examiner—James R. Feyrer

[57] ABSTRACT

A mushroom cultivation method and apparatus concentrate the sunlight through a sunlight concentrating device 17 and introduce the sunlight into a hermetically sealed cultivation chamber through optical fibers 8 at a cultivation term after completion of scrambling of mushroom spawn (operation of budding mushrooms). Mushrooms are irradiated with the introduced sunlight intermittently for a predetermined time. Cultivation environment near natural growing environment can be formed. The intensity of illumination, a wavelength and an irradiating time of the sunlight are adjusted if necessary.

3 Claims, 2 Drawing Sheets

METHOD AND APPARATUS FOR CULTIVATING MUSHROOMS

DESCRIPTION

1. Technical Field

The present invention relates to a mushroom cultivation method and apparatus which can obtain mushrooms which are not almost different from natural mushrooms by an artificial cultivation.

2. Background Art

Heretofore, mushrooms have been cultivated in an artificial growing environment, for example a mushroom cultivation chamber, to produce cultivated mushrooms having a form quite different from that of wild mushrooms.

The reason thereof is because a chamber hermetically sealed in a heat insulated slate is used to control cultivation environment on the basis of temperature and humidity which are the most important conditions in the artificial cultivation to the optimum state. However, it is considered that the cultivation chamber is difficult to be adjusted to a natural cultivation environment by such a simple method.

More particularly, in the plant cultivation field, there is known a plant cultivation apparatus which can adjust temperature and humidity to obtain an optimum growing condition as disclosed in Japanese Unexamined Patent Publication No. 59-16945. The plant cultivation apparatus is provided with a transparent window through which the sunlight is introduced directly in order to form an environment approximating the natural environment. However, heat of the sunlight is introduced concurrently with the introduction of the sunlight. Thus, it is very difficult to adjust the cultivation environment to approximate the natural growing environment. On the other hand, when the natural growing environment of mushrooms is observed, most mushrooms grow in a forest and do not require the sunlight as much as that required by other plants. Further, the time and interval of irradiation of the sunlight are random depending on the presence of the forest. Consequently, the conventional plant cultivation apparatus or chamber can not be quite applied to the cultivation of mushrooms.

Accordingly, it is an object of the present invention to provide a mushroom cultivation method and apparatus by which one can harvest artificially cultivated mushrooms having a substantially identical form to natural mushrooms.

Further, it is another object of the present invention to provide a mushroom cultivation method and apparatus by which one can obtain mushrooms with small stalks in contact with a culture ground, easy harvest work, a good harvest, excellent freshness kept for a long time, characteristics of keeping from influence by the rain, mold, mud and insects, and excellent external appearance and quality.

DISCLOSURE OF INVENTION

The mushroom cultivation method according to the present invention is characterized in that the sunlight of which the intensely of illumination, the wavelength and the irradiation time are adjusted is introduced into the cultivation chamber through light transmission means such as, for example, optical fibers in the cultivation term after completion cf scrambling of spawn (operation of budding mushrooms) and mushrooms are irradiated with the introduced sunlight intermittently for a predetermined time.

Further, the mushroom cultivation apparatus implementing the cultivation method is characterized by the provision of a chamber sealed in a heat insulated state except for a sunlight introducing device for introducing the sunlight into the sealed chamber, and an intermittently irradiating device for irradiating the introduced sunlight at least intermittently.

Such a cultivation method and apparatus can easily form the environment near the natural growing environment for mushrooms and can obtain mushrooms similar to natural mushrooms with respect to the form and the quality thereof.

The sunlight described in the present invention includes light from an artificial sun as well as natural light and more particularly includes light having part or all of the wavelength range contained in natural light.

BEST MODE FOR CARRYING OUT THE INVENTION

Figure 1:
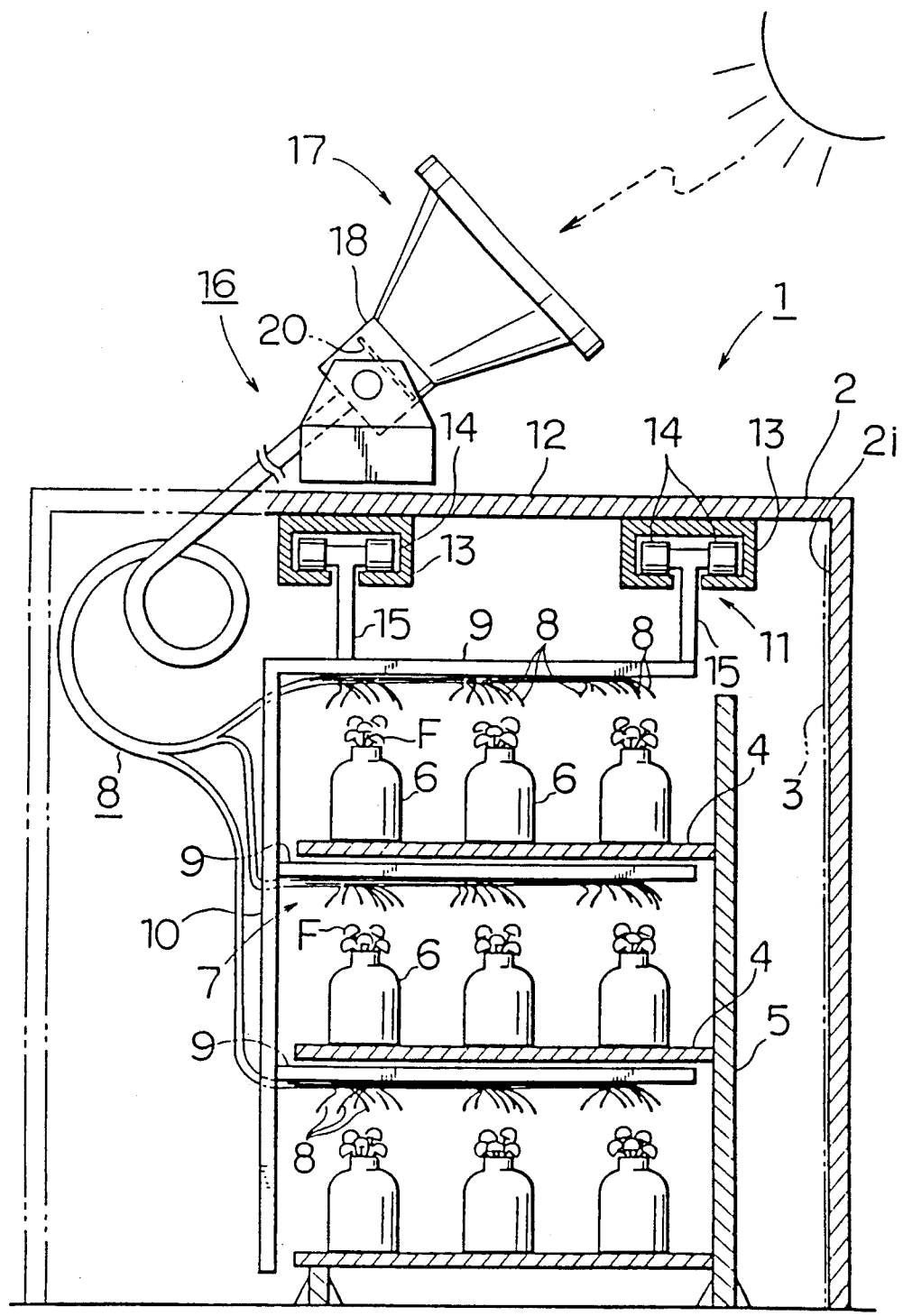
FIG. 1 schematically illustrates a mushroom cultivation apparatus showing an example of the present invention.

A mushroom cultivation apparatus is now described with reference to FIG. 1.

The cultivation apparatus 1 includes a chamber 2 sealed in a heat insulated state. A reflective material 3 is affixed on the whole or partial surface 2i of an inner wall of the sealed chamber 2, if necessary. A plurality of cultivation shelves 4 are supported by a support 5 and a plurality of cultivation bottles 6 are put on the shelves 4. The cultivation shelves 4 are preferably formed of a netlike plate through which the sunlight can easily pass.

On the other hand, an intermittently irradiating device 7 supports optical fibers 8 constituting an optical transmission portion. The device 7 includes a plurality of mounting plates 9 disposed above the cultivation bottles 8 with inner ends of the plurality of optical fibers 8, extending downwardly from attachment points on the lower surfaces of the mounting plates a support plate 10 which supports the mounting plates 9, and a movement controller 11 which controls horizontal movement of the support plate 10. Further, the movement controller 11 includes guide rails 13 fixedly mounted to a ceiling 12, rollers 14 which are led by the guide rails 13, supporting rods 15 which couple between the rollers 14 and the uppermost of the mounting plates 9, and a drive device not shown. Illumination directions from the inner ends of the optical fibers 8 serving as a floodlight are set to irradiate mushrooms F as uniformly as possible. With the construction of the movement controller 11, the inner ends of the optical fibers 8 can be moved to traverse above the cultivation bottles 6.

Further, outer ends of the optical fibers 8 are connected to a sunlight concentrating device 17 disposed outside of the sealed chamber 2 to concentrate the sunlight effectively to constitute a sunlight introducing device 16. The concentrating device 17 includes an adjusting device 18 which processes the sunlight to control the intensity of illumination and the irradiating time of the sunlight and a filter 20 which selects a wavelength of the sunlight.

The mushroom cultivation method using the above cultivation apparatus 1 is now described.

Figure 2:
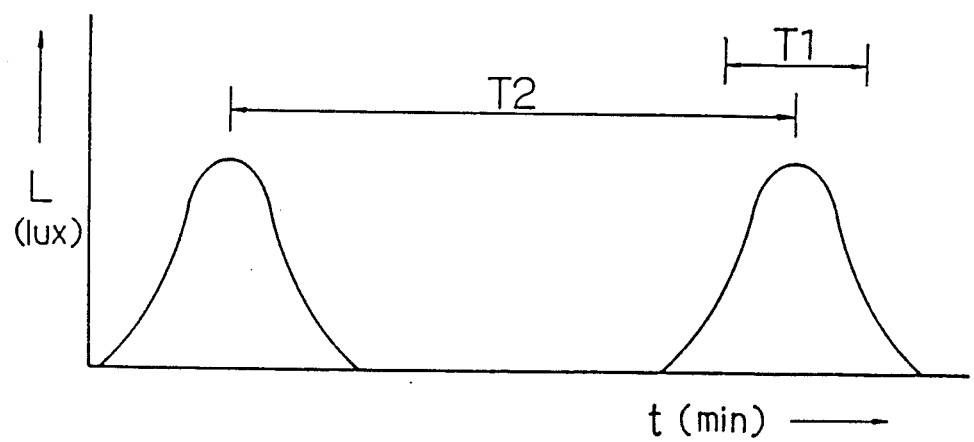
FIG. 2 is a characteristic diagram showing the intensity of illumination of the sunlight with respect to time according to the mushroom cultivation method of the present invention.
Figure 3:
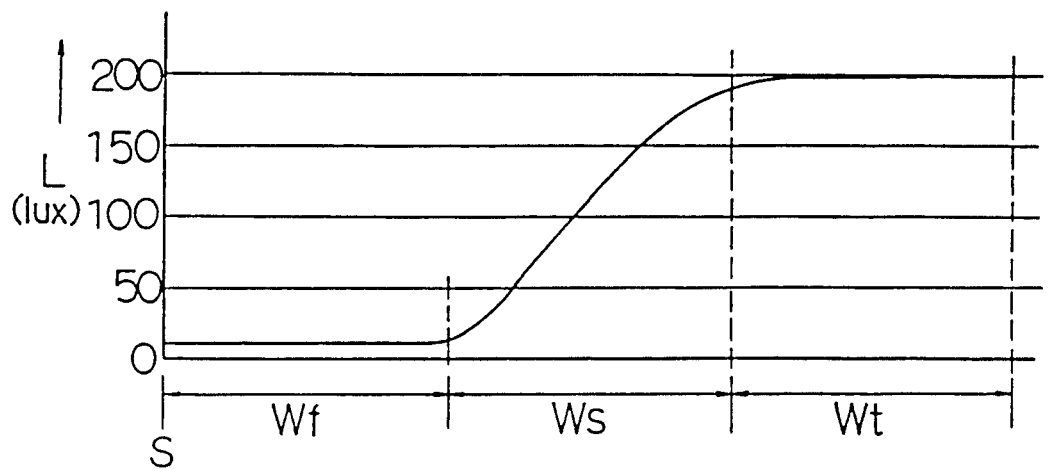
FIG. 3 is a characteristic diagram showing the intensity of illumination of the sunlight with respect to the cultivation time of mushrooms.

Spawn of Hyspizygus marmoreus is inoculated into the cultivation bottles 6 filled with the mushroom culturing ground to culture spawn in the ordinary manner. The mushroom culturing ground is formed of sawdust mixed with rice bran. When the culture of spawn has been completed, the outer periphery of the surface is subjected to scrambling of spawn (operation of budding mushrooms). Thereafter, only visible rays having the wavelength of about 380 to 700 nm of the sunlight from the outside are introduced through the filter 20 about 21 days of the cultivation term to maintain the intensity of illumination to be preferably 200 Luxes or less. Further, the intermittently irradiating device 7 is operated, that is, the device is reciprocated along the guide rails 13 so that the inner ends of the optical fibers 8 pass above the cultivation bottles 6 successively to irradiate each of the cultivation bottles 6 intermittently as shown in FIG. 2, in which the axis of abscissa shows time t in minute. A irradiating cycle of the sunlight can be set so that a substantially irradiating time T1 is about one minute and a non-irradiating time T2 is about three minutes. The intensity of illumination L (Lux) of the sunlight shown in the axis of ordinate is different depending on the time of the cultivation term and can be set as shown in FIG. 5, in which Wf indicates a first week corresponding to the time of budding mushrooms. The time of budding mushrooms requires the intensity of illumination of about 10 Luxes. Further, Ws indicates a second week corresponding to the growing time. The intensity of illumination is gradually increased to about 200 Luxes. Thus, when the intensity of illumination of about 200 Luxes is maintained in a third week (the growing time) shown by Wi, good results are obtained.

Comparison results between mushrooms of Hyspizygus marmoruus harvested by the method of the present invention and mushrooms harvested by a conventional artificial cultivation method are now described.

Mushrooms harvested by the conventional artificial cultivation method possess the following characteristics:

(1) A cap portion of mushrooms is small, thick and fine. The surface of the cap has black spot pattern.

(2) A stalk portion of mushrooms in contact with the culture ground occupies 30 to 40% of the whole body.

(3) Freshness of mushrooms is maintained for 3 to 4 days in the case of mushrooms of which freshness is not maintained for a long time, and thereafter mushrooms rot by themselves.

On the contrary, mushrooms harvested by the method of the present invention possess the following characteristics:

(1) A cap portion of mushrooms is not different from that of natural mushrooms and has a periphery which is thin and hands down. The cap portion is a so-called center projection type in which the center portion of the cap is projected high.

(2) A stalk portion of mushrooms in contact with the culture ground is small and accordingly it is not necessary to dig the ground by a tool upon harvest. Mushrooms can he easily taken by hand.

(3) Distribution of spawn is good and the harvest of mushrooms is 1.8 times as compared with the conventional harvest. Accordingly, an actual harvest is twice as compared with the conventional harvest when considering the small stalk portion in contact with the culture ground.

(4) Freshness of mushrooms is maintained good and even if 5 days has elapsed, the quality thereof is not changed almost. While the temperature in the cultivation environment is maintained to 14° C. in the conventional cultivation method, the temperature in the cultivation environment according to the method of the present invention may be a room temperature in the range of 5° C. to 30° C. and can use the outside temperature effectively. Accordingly, air cooling and heating are merely used supplementarily or can not be required.

(5) Mushrooms have no smell of rice bran and have taste containing rice bran highly. Particularly, mushrooms have natural flavor and hence it can be expected that mushrooms are worked into paste or powder to utilize an annex for foodstuff or raw material for natural solid sauce.

While the best mode of the present invention has been described, the present invention is not limited thereto and any modification can be made without departing from the spirit of the invention. For example, kinds of mushrooms, the wavelength, the irradiating time and days of the sunlight can be varied.

What is claimed is:

1. An apparatus for cultivating mushrooms in prepared cultivation containers containing mushroom spawn which have been subjected to a scrambling operation, comprising a cultivation chamber, a plurality of cultivation shelves disposed in a vertical array on a support within said chamber to hold the prepared cultivation containers in rows in spaced relationship, a sunlight introducing device being disposed outside said chamber, said sunlight introducing device including a sunlight concentration device for collecting sunlight, and an intermittently irradiating device, said irradiating device including a mounting plate assembly, said assembly including support plate and a plurality of mounting plates, said mounting plates being disposed generally horizontally and being connected to said support plate, one of said mounting plates being disposed above each of said cultivation shelves, said assembly being movable in a reciprocating manner in the horizontal direction, a plurality of optical fibers, each of said fibers having a first end and a second end, said optical fibers extending from said first ends located to receive light at said sunlight introducing device through a wall of said chamber to be mounted from said mounting plates such that said second ends extend from said mounting plates in correspondence above a row of cultivation containers placed on said cultivation shelves, said optical fibers transmitting sunlight from said sunlight introducing device for irradiation of the mushrooms, and a movement controller to move said assembly in a reciprocating manner to irradiate the sunlight introduced through said optical fibers onto the mushrooms intermittently, wherein said cultivation chamber is sealed in a heat insulated state after the prepared cultivation containers are disposed on said cultivation shelves.

2. The apparatus for cultivating mushrooms according to claim 1, wherein said sunlight concentration device includes an adjusting unit capable of controlling at least the intensity of illumination transmitted along said optical fibers.

3. The apparatus for cultivating mushrooms according to claim 1, wherein said sunlight concentration device includes a filter for selecting wavelength of the sunlight transmitted along said optical fibers.

* * * * *